(12) United States Patent
Tabata

(10) Patent No.: US 6,996,267 B2
(45) Date of Patent: *Feb. 7, 2006

(54) VISUAL IMAGE SYSTEM

(75) Inventor: Seiichiro Tabata, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 258 days.

This patent is subject to a terminal disclaimer.

(21) Appl. No.: 10/611,963

(22) Filed: Jul. 3, 2003

(65) Prior Publication Data

US 2004/0057612 A1 Mar. 25, 2004

Related U.S. Application Data

(62) Division of application No. 09/323,694, filed on Jun. 2, 1999, now Pat. No. 6,614,927.

(30) Foreign Application Priority Data

Jun. 4, 1998 (JP) .................................. 10-170531

(51) Int. Cl.
*G06K 9/00* (2006.01)

(52) U.S. Cl. ...................... 382/154; 345/419; 348/47; 348/57; 348/59; 359/458; 359/464; 359/473; 382/236; 382/285

(58) Field of Classification Search ................ 345/419; 348/47, 57, 59; 359/458, 464, 473; 382/154, 382/236, 285

See application file for complete search history.

(56) References Cited

U.S. PATENT DOCUMENTS

| 4,870,600 A | 9/1989 | Hiraoka ...................... 345/419 |
| 5,726,704 A | 3/1998 | Uomori ........................ 348/47 |
| 5,771,066 A | 6/1998 | Barnea ......................... 348/59 |
| 5,872,590 A | 2/1999 | Aritake et al. ................. 348/57 |
| 6,005,607 A | 12/1999 | Uomori et al. ................ 348/42 |
| 6,023,277 A | 2/2000 | Osaka et al. .................. 345/419 |
| 6,054,969 A | 4/2000 | Haisma .......................... 345/7 |
| 6,061,179 A | 5/2000 | Inoguchi et al. ............. 359/464 |
| 6,198,484 B1 | 3/2001 | Kameyama ................... 345/419 |
| 6,204,876 B1 | 3/2001 | Uomori et al. ................ 348/47 |
| 6,278,480 B1 | 8/2001 | Kurahashi et al. ............. 348/59 |
| 6,285,368 B1 | 9/2001 | Sudo ........................... 345/419 |
| 6,324,001 B2 | 11/2001 | Tabata ......................... 359/462 |

OTHER PUBLICATIONS

Patent Abstract of Japan vol. 1997, No. 05,May 30, 1997 & JP 09 018894 A (Sanyo Electric Co. Ltd), Jan. 17, 1997 *abstract*.
Patent Abstract of Japan vol. 1997, No. 11, Nov. 28, 1997 & JP 09 192349 A (Taito Corp), Jul. 29, 1997 *abstract*.

*Primary Examiner*—Daniel Miriam
*Assistant Examiner*—Gregory Desire
(74) *Attorney, Agent, or Firm*—Westerman, Hattori, Daniels & Adrian, LLP

(57) ABSTRACT

A visual image system is constructed as including: a three-dimensional visual image reproducer for transmitting a three-dimensional video signal; a parallax quantity detecting section for detecting a parallax quantity in the three-dimensional video signal from the three-dimensional visual image reproducer; a fatigue measure estimating section for estimating the degree of fatigue based on the detected parallax quantity and outputting an image switching signal correspondingly to a fatigue measure estimating quantity; a 3D/2D image switching section for providing an output by switching between three-dimensional and two-dimensional images based on the image switching signal; and an image display section for displaying a three-dimensional image or a two-dimensional image. The visual image system thereby fulfills the capability of suitably controlling the degree of three-dimensionality of stereoscopic images by inferring from the inputted video signal the degree of effects likely to be produced on the observer.

15 Claims, 14 Drawing Sheets

LEFT IMAGE

RIGHT IMAGE

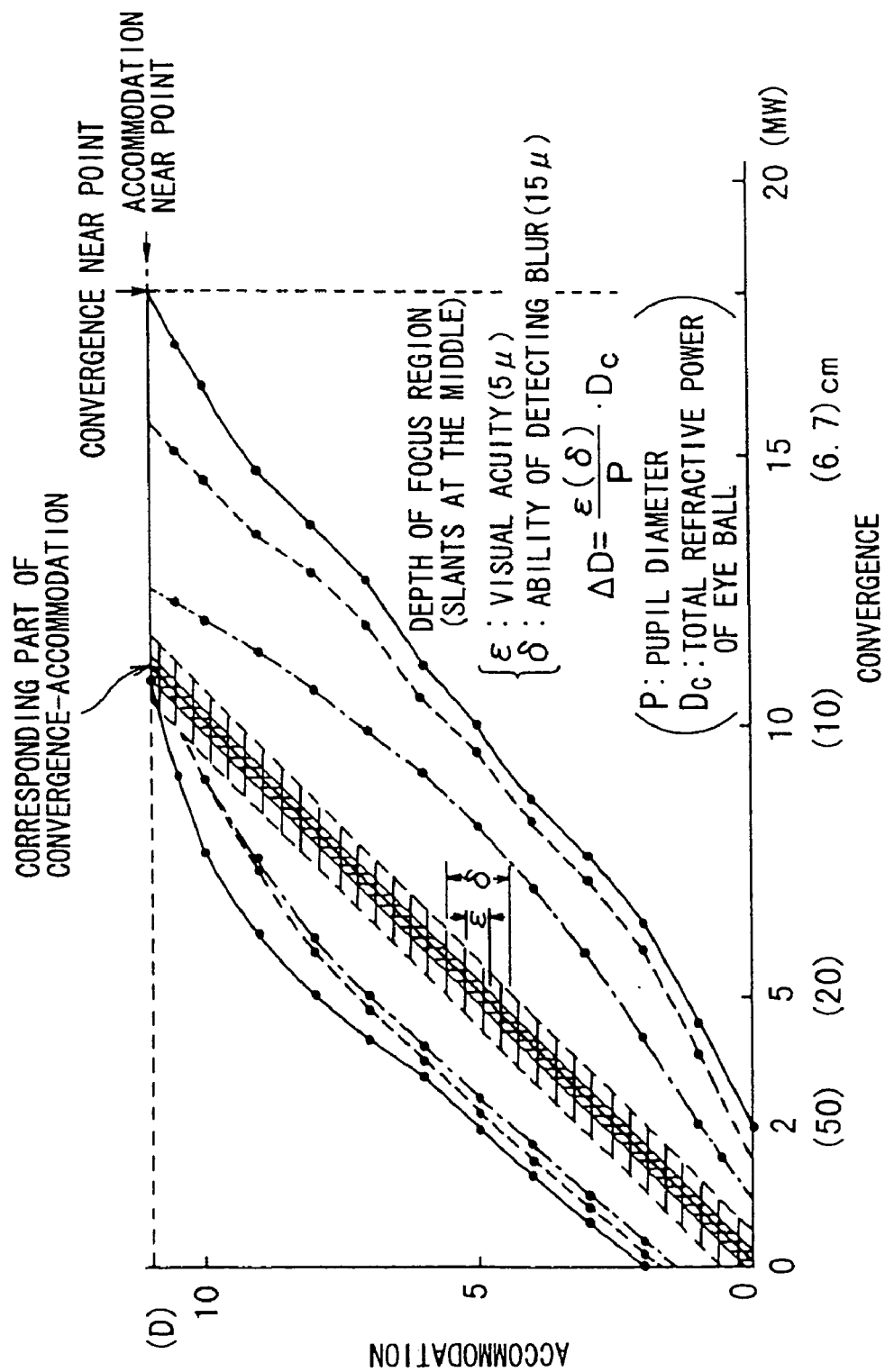

XL

XR

←----

XL'

---→

XR'

VISUAL IMAGE SYSTEM

This application is a divisional of application Ser. No. 09/323,694 filed Jun. 2, 1999 now U.S. Pat. No. 6,614,927.

BACKGROUND OF THE INVENTION

The present invention relates to visual image systems and, more particularly, relates to a visual image system in which the degree of three-dimensionality is controlled by estimating effects produced on the observer based on video signals.

Various proposals have been made with respect to visual image systems. For example, the following technique is disclosed in Japanese Patent Publication No.2594235 as that for converting two-dimensional visual image into three-dimensional visual image. In particular, a disclosure has been made with respect to a method for converting a two-dimensional visual image into a three-dimensional visual image in which the extent and direction of a horizontal motion in image is detected using a two-dimensional video signal by generating from the two-dimensional video signal a main video signal serving as a reference and a subordinate video signal delayed from the main video signal. The delay amount for generating subordinate video signal is then determined on the basis of an extent of motion and an image switching means for inputting the main or subordinate video signal is regulated depending on the direction of the motion, thereby providing an output with determining which one of the main or subordinate video signal is outputted as a left-eye video signal or a right-eye video signal.

Further, the following technique is disclosed in Japanese patent application laid open No.9-116928. In particular, a disclosure has been made with respect to technique for converting a two-dimensional visual image into a three-dimensional visual image in which a first phase-shifted visual image of which horizontal phase is gradually delayed by each one field along a vertical direction is produced based on a two-dimensional input image and a second phase-shifted visual image of which horizontal phase is gradually advanced by each one field along the vertical direction is produced based on the input image. One of the first phase-shifted and second phase-shifted images is used as a visual image for the left eye and the other is used for a visual image for the right eye.

It is generally said that the eyes are more likely to become fatigued when observing a stereoscopic image comparing to the case of observing an ordinary two-dimensional image. As a proposal considering this point, Japanese patent application laid open No.9-23451 discloses an apparatus for controlling stereoscopic condition as follows. In particular, a disclosure has been made with respect to a controlling apparatus in which: a sensor for detecting a temperature of skin at the forehead and a sensor for detecting a temperature of skin at the nose are set on glasses for viewing stereoscopic images so that a measure of excitation is provided from an excitation measure data converter based on their detected outputs; and a sensor for detecting blink is set on the glasses for viewing stereoscopic images so that a measure of fatigue is provided based on its detected output. A measure of enhancement on three-dimensionality is then outputted from a stereoscopic enhancement controlling circuit based on the degree of excitation and the degree of fatigue. The delay amount at a field memory of the stereoscopic television receiver for effecting 2D/3D conversion is controlled depending on this stereoscopic enhancement measure, thereby making it possible to control to a stereoscopic condition which is desirable according to the user's sensitivity.

In the case of controlling the degree of three-dimensionality of stereoscopic image based on the degree of excitation and degree of fatigue of the user as in the method of the above-mentioned disclosure, however, the biological measurements on the user vary greatly from one individual to another, making it difficult to determine from the biological measurements a limit value of fatigue measure which is suitable to all the observers. Furthermore, there is another problem that it is troublesome to individually obtain the measurements from each observer.

SUMMARY OF THE INVENTION

To eliminate the above problems in the known apparatus for controlling the degree of three-dimensionality of stereoscopic image, it is a main object of the present invention to provide a visual image system in which the degree of effects likely to be produced on the observer is inferred from inputted video signal without performing any biological measurement on the observer and it is thereby possible to suitably control a three-dimensionality measure of stereoscopic image.

In accordance with the present invention, there is provided a visual image system including: influence measure estimating means for estimating from inputted video signal the degree of influence produced on an observer; and three-dimensionality controlling means for restraining the degree of three-dimensionality of stereoscopic image to be presented to the observer based on an influence measure estimating quantity obtained at the influence measure estimating means. Further, in accordance with the invention, there is provided a visual image system including: influence measure estimating means for estimating from inputted video signal the degree of influence produced on an observer; and means for regulating switching of stereoscopic image to two-dimensional image based on an influence measure estimating quantity obtained at the influence measure estimating means.

The degree of influence produced on the observer is thus estimated from inputted video signal and, on the basis of such influence measure estimating quantity, the degree of three-dimensionality of stereoscopic image is restrained or switching from stereoscopic image to two-dimensional image is regulated. It is thereby possible to achieve a visual image system in which stereoscopic image can be suitably controlled so as not to produce such effects as fatigue on the observer without any biological measurement on the observer. The above main object is thereby accomplished.

It is another object of the present invention to provide a visual image system in which a suitable control on displaying method of visual image such as switching of stereoscopic image to two-dimensional image or restraining of parallax quantity for the purpose of not producing such effects as fatigue on the observer can be effected also without any biological measurement on the observer.

In accordance with the present invention, there is provided a visual image system including: influence measure estimating means for estimating from inputted video signal the degree of influence produced on an observer; and display controlling means for controlling displaying method of visual image to be presented to the observer based on an influence measure estimating quantity obtained at the influence measure estimating means.

The degree of influence produced on the observer is thus estimated from inputted video signal and the displaying method of visual image is controlled on the basis of such influence measure estimating quantity. It is thereby possible to achieve a visual image system in which a suitable control on displaying method of visual image such as switching of stereoscopic image to two-dimensional image or restraining of parallax quantity for the purpose of not producing such effects as fatigue on the observer can be effected also without any biological measurement on the observer. The above object is thereby accomplished.

BRIEF DESCRIPTION OF THE DRAWINGS

FIG. 3 shows correspondence between convergence and accommodation and their allowable range explaining the relationship between parallax quantity and fatigue.

DESCRIPTION OF THE PREFERRED EMBODIMENT

Figure 1:
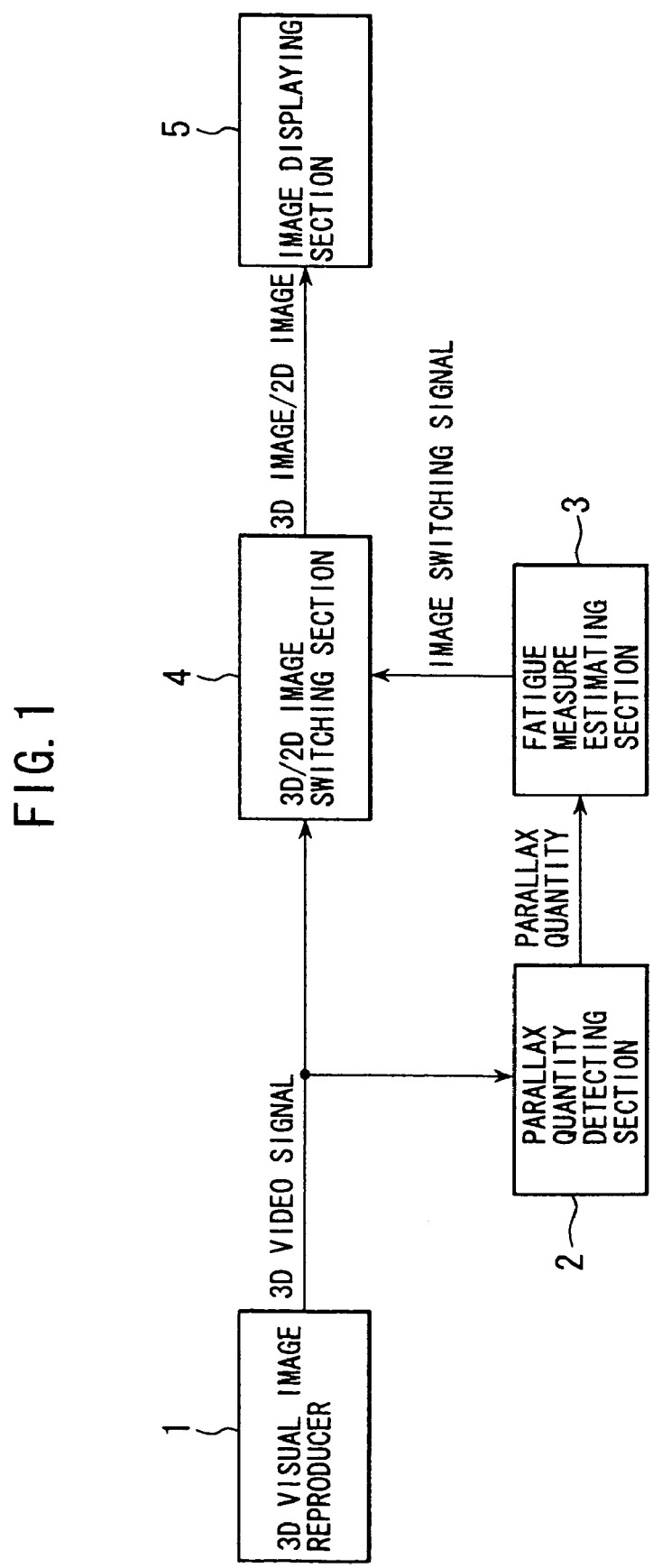
FIG. 1 is a schematic block diagram showing a first embodiment of the visual image system according to the present invention.

Some embodiments will now be described. FIG. 1 is a schematic block diagram showing a first embodiment of the visual image system according to the present invention. Referring to FIG. 1: what is denoted by numeral 1 is a three-dimensional image reproducer for transmitting three-dimensional video signal; 2, a parallax quantity detecting section for detecting a parallax quantity in three-dimensional video signal outputted from the three-dimensional image reproducer 1; 3, a fatigue measure estimating section for estimating a fatigue measure based on the parallax quantity detected at the parallax quantity detecting section 2; 4, a 3D/2D image switching section for providing output by switching between three-dimensional video signal and two-dimensional video signal in accordance with an image switching signal which is provided on the basis of the estimation of fatigue measure; 5, an image display section for displaying a three-dimensional image or a two-dimensional image outputted by the image switching section 4. It should be noted that, in the figure, 3D image represents a three-dimensional image and 2D image represents a two-dimensional image.

Figure 2A:
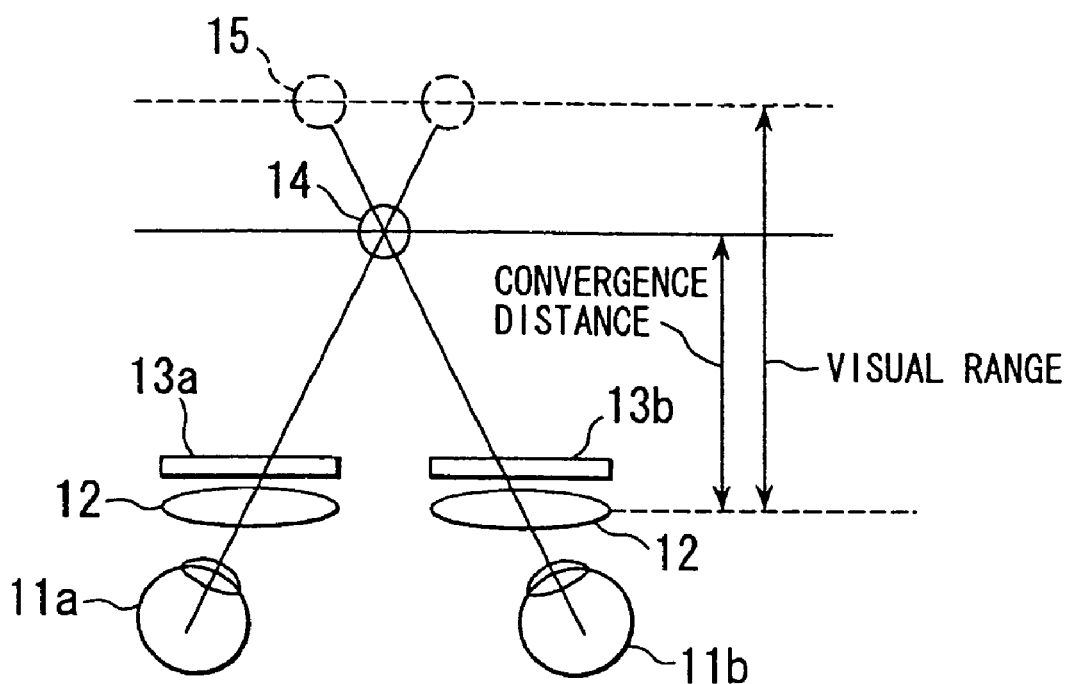
FIGS. 2A, 2B, 2C are illustrations for explaining parallax quantity in a three-dimensional image.
Figure 2B:
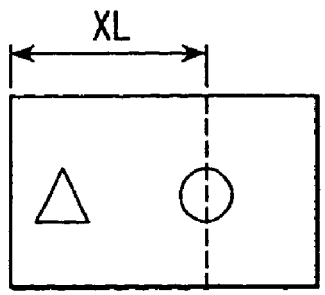
Figure 2C:
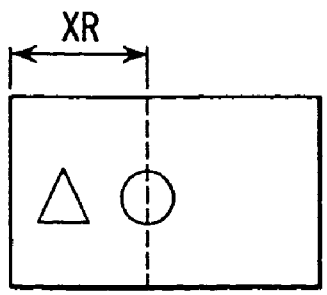

A description will now be given by way of FIGS. 2A to 2C with respect to parallax quantity in a three-dimensional video signal. FIG. 2A shows the manner of observing a three-dimensional (stereoscopic) image where a sphere appears as jutting out, in which: denoted by numerals 11a and 11b are the left and right eyes, respectively; 12 is a lens disposed immediately in front of the left and right eyes; and 13a and 13b are a left-eye LCD visual image display section and a right-eye LCD visual image display section, respectively, located adjacent to the lens 12, on which the visual images shown in FIGS. 2B and 2C are displayed, respectively. Referring to FIGS. 2B, 2C, mark $\Delta$ represents an image at infinity and mark $\bigcirc$ represents a sphere which is displayed three-dimensionally (in a jutting out manner). Here, XL represents the horizontal position of the sphere in the left-eye image and XR represents the horizontal position of the sphere in the right-eye image, these being not equal to each other in value and shifted toward the right or toward the left from their median.

In FIG. 2A, what is denoted by numeral 15 is a virtual image position at which the sphere viewed by the left and right eyes is displayed, the eyes being focused on this position. Denoted by numeral 14 is a fusion image position at which the two images at the virtual image position 15 are viewed as one image by the two eyes. Here, the distance from the position of lens 12 to the fusion image position 14 is referred to as a convergence distance and the distance from the position of lens 12 to the virtual image position 15 is referred to as a visual range. The parallax quantity, represented by the difference in horizontal position between the left and right images (XL–XR), is in conformity with the convergence distance so that a larger parallax quantity means a greater jutting out toward the observer.

A description will now be given with respect to the relationship between the parallax quantity and the fatigue measure. A diagram as shown in FIG. 3, indicating a correspondence between convergence and accommodation and their allowable range, and a disclosure of the following spirit can be found in a Japanese journal "Seiri-kogaku" (Kabushikigaisha Shin-gijutsu Communications, December 1985: pp.103–105). The convergence along the axis of abscissa in FIG. 3, corresponding to the convergence distance, is represented by convergence angle (MW) and the distance of its reciprocal. On the other hand, the accommodation along the axis of ordinate, corresponding to the visual range, is represented by diopter "D". Referring to FIG. 3, the 45-degree solid line at the center represents the portion of complete correspondence between convergence and accommodation, the vicinity thereof indicating a range which is allowable for example due to depth of focus. The range somewhat varies depending on the adopted reference for allowance, i.e., visual acuity ($\epsilon$:5$\mu$) or blur detectivity ($\delta$:15$\mu$). The curves on the outer sides represent fusion image limit of the two eyes: the solid lines through black dots represent a maximum fusion image limit; the dotted lines represent the range in which a fusion image is established again from a condition of double images; and the dashed lines represent a fusion image limit when the image displaying time is 0.5 sec. A disclosure is made therein that a feeling of exhaustion is caused by a prolonged observation of a dynamic image unless it is a stereoscopic reproduction within the dashed-line range.

The present invention has been made based on these disclosures. A description will now be given by way of a flowchart in FIG. 4 with respect to an algorithm to be executed at the fatigue measure estimating section in the embodiment shown in FIG. 1. First, a parallax "p" is detected from the left and right three-dimensional video signals (step S1). A function value for estimating the fatigue measure is then calculated based on the detected parallax "p" (step S2). This function calculation is performed by considering the influence (fatigue) produced on the observer's eye by a parallax in the stereoscopic image. For example, a measure of such influence on the eye may be obtained from the diagram shown in FIG. 3, showing a correspondence between convergence (parallax) and accommodation (visual range) and their allowable range. It is indicated in FIG. 3 that: the larger the difference between convergence (parallax) and accommodation (visual range) the greater the degree of influence (fatigue measure) produced on the eye. As an example of the function f(p) for expressing the influence measure in such case, a function is formed as shown in the following equation (1) where an increase in ("visual range"–"parallax") results in a nonlinear increase in the influence measure.

$$\text{"Influence measure"} = \alpha(\text{"Visual range"} - \text{"Parallax"})^2 + \beta(\text{"Visual range"} - \text{"Parallax"}) + \gamma \quad (1)$$

It is also known from the results of experiments conducted by the present inventors that: the larger the temporal change in parallax the greater the degree of influence on the eye. Accordingly, a function as shown in the following equation (2) may also be formed as an example of the function f(p) for expressing the influence measure.

$$\text{"Influence measure"} = \alpha(\text{"Temporal change in parallax"})^2 + \beta(\text{"Temporal change in parallax"}) + \gamma \quad (2)$$

It should be noted that $\alpha$, $\beta$, $\gamma$, in the above equations (1), (2) are coefficients and constants.

Next, the value of influence measure f(p) obtained by the above function calculation is compared with an allowable limit value "a" of convergence (fusion image) (for example the solid lines through the black dots in FIG. 3) at which visual images may be recognized as a stereoscopic image (step S3). This allowable convergence limit value "a" may be regarded as an allowable fatigue limit value. If the value of influence measure f(p) obtained by the function calculation based on parallax is greater than the allowable convergence limit value "a", the system is switched to display a two-dimensional image (step S4). If the value of influence measure f(p) is smaller than the allowable convergence limit value "a", a time accumulation of the value of influence measure f(p) is calculated (step S5). The accumulated calculation value of the influence measure value f(p) obtained by the function calculation based on parallax is then compared with an allowable accumulated convergence limit value "b" (step S6).

This allowable accumulated convergence limit value "b" may be regarded as an allowable accumulated fatigue limit value and may be previously set by the maker of the apparatus, be individually adjusted and set by the user or be set by the user in accordance with the degree of fatigue when actually used. If the allowable accumulation convergence limit value "b" has been exceeded, the system is switched to display a two-dimensional image (step S7). If the allowable accumulation convergence limit value "b" has not been exceeded, the three-dimensional (stereoscopic) visual image is displayed as it is (step S8) and the above operation is executed in repetition.

According to this algorithm, the system is automatically switched to a two-dimensional image when a three-dimensional image exceeding the fusion image limit has been received for a short time period, and it goes back to display a stereoscopic image upon returning of a visual image of a lesser influence measure. If, then, fatigue has been accumulated and exceeded the limit value as a result of observing three-dimensional image for a long time period, the system is automatically switched to a two-dimensional image and, thereafter, a two-dimensional image is to be observed.

Figure 4:
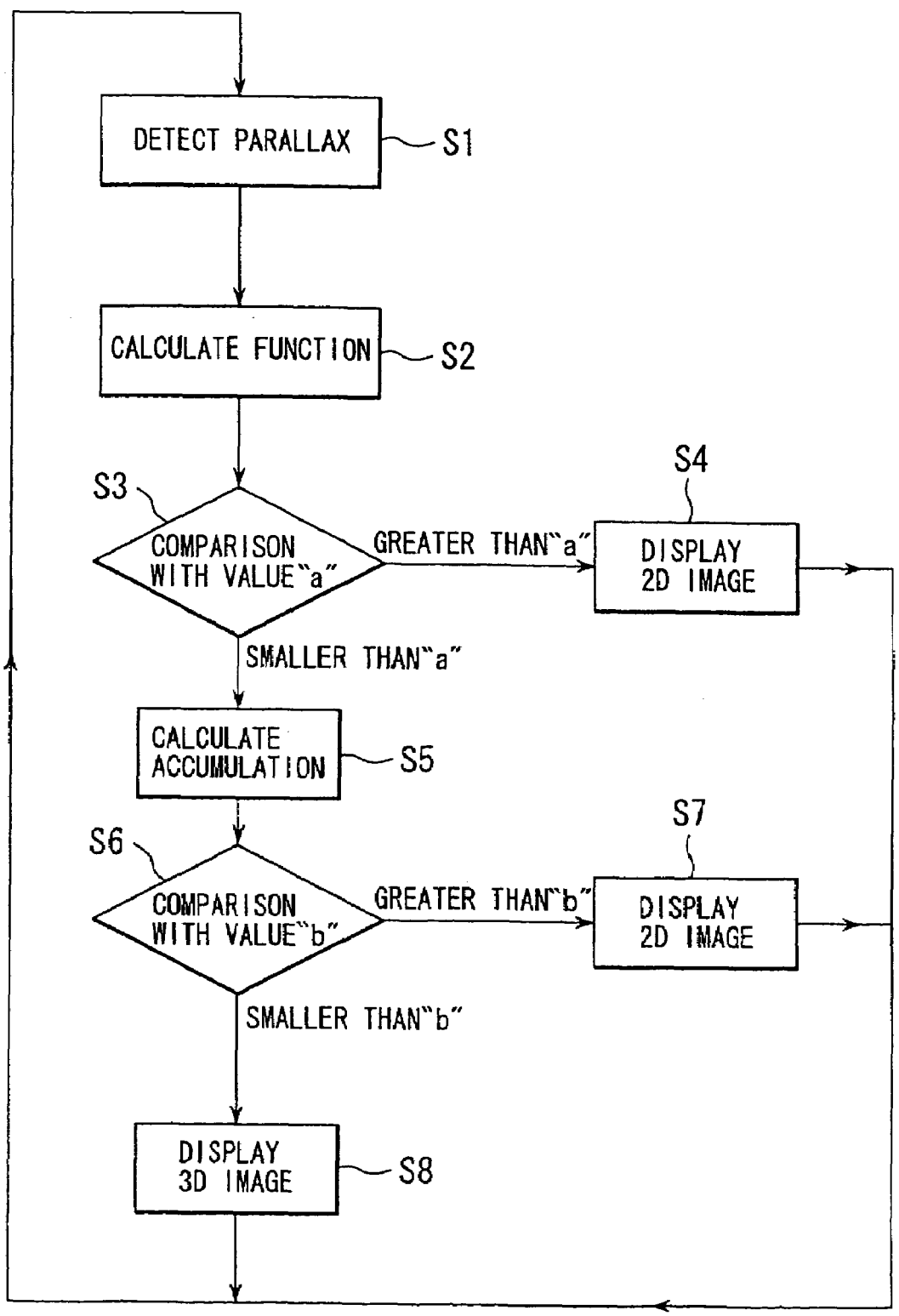
FIG. 4 is a flowchart for explaining an algorithm to be followed at the fatigue measure estimating section in the first embodiment shown in FIG. 1.
Figure 5:
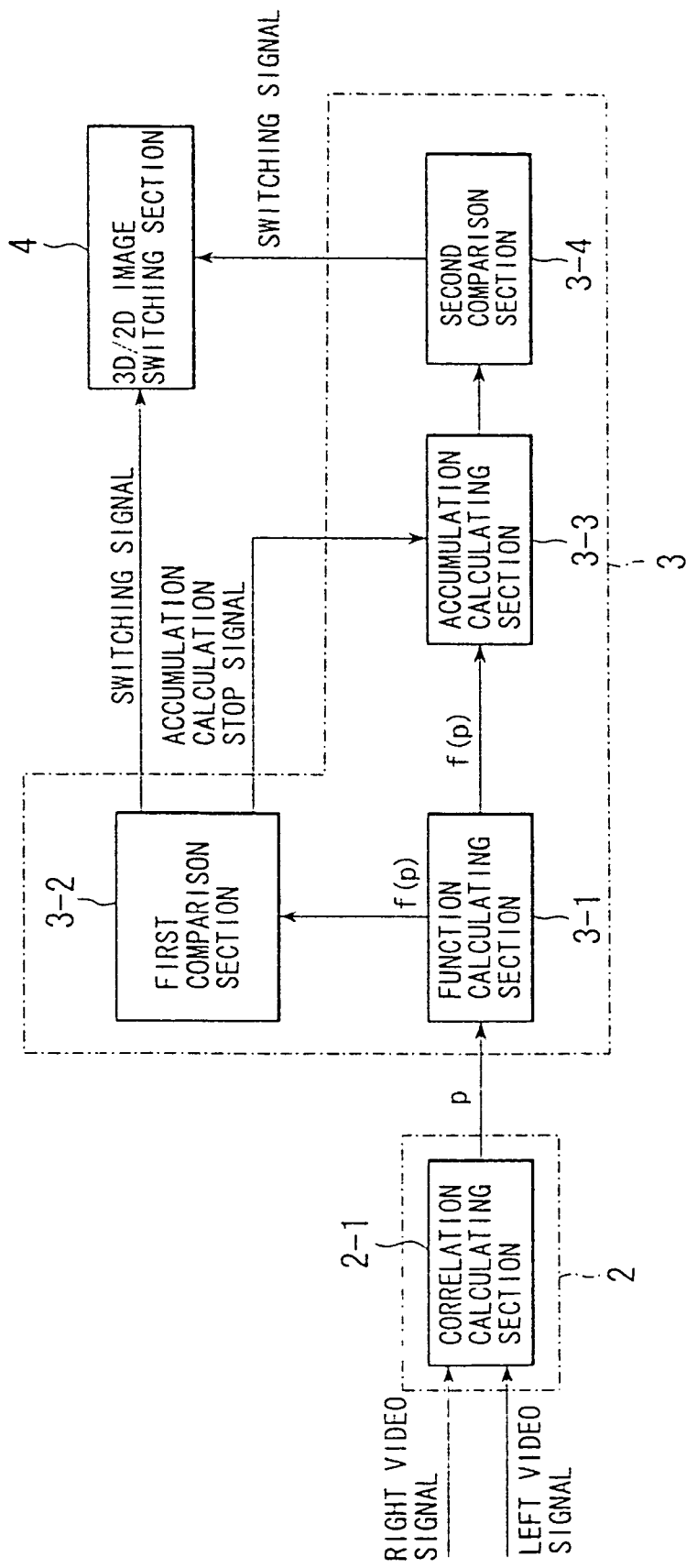
FIG. 5 is a block diagram showing a construction of the fatigue estimating section in the first embodiment shown in FIG. 1.

A description will now be given by way of a block diagram in FIG. 5 with respect to the construction of the parallax quantity detecting section and fatigue measure estimating section for executing the algorithm shown in FIG. 4. The parallax quantity detecting section 2 is constituted by a correlation calculating section 2-1 at which a parallax signal "p" is obtained by performing a correlation calculation of the left and right video signals. The fatigue measure estimating section 3 includes a function calculating section 3-1 which receives the parallax signal "p" outputted from the parallax quantity detecting section 2 and provides a corresponding value of the function f(p) of influence measure (fatigue measure). An actual function calculation is not performed at the function calculating section 3-1, but it includes a table within a ROM so that, when a value of the parallax signal "p" has been inputted, a value of f(p) matching the corresponding influence measure (fatigue measure) is read out.

The fatigue measure estimating section 3 further includes: a first comparison section 3-2 for receiving the value of function f(p) outputted from the function calculating section 3-1 and comparing it with the above described allowable convergence limit value "a"; and an accumulation calculating section 3-3 for also receiving the value of function f(p) outputted from the function calculating section 3-1 and calculating the time accumulation of such value f(p). If the value f(p) from the function calculating section 3-1 is greater than the allowable convergence limit value "a" at the above described first comparison section 3-2, a signal for temporarily switching the stereoscopic image to a two-dimensional image is provided to the 3D/2D image switching section 4 and at the same time a stop signal for temporarily stopping the accumulation calculation is transmitted to the above described accumulation calculating section 3-3. The fatigue measure estimating section 3 furthermore includes a second comparison section 3-4 for comparing the accumulated value outputted from the accumulation calculating section 33 with the above described allowable accumulated convergence limit value "b". A signal for switching the stereoscopic image to a two-dimensional image is continuously transmitted when the accumulated value from the accumulation calculating section 3-3 has exceeded the allowable accumulated convergence limit value "b". It should be noted that, since the value of allowable accumulated convergence limit value "b" to be used at the above described second comparison section 3-4 may be set by using various methods as previously described, means for setting the "b" values is provided correspondingly to such setting methods.

Figure 6:
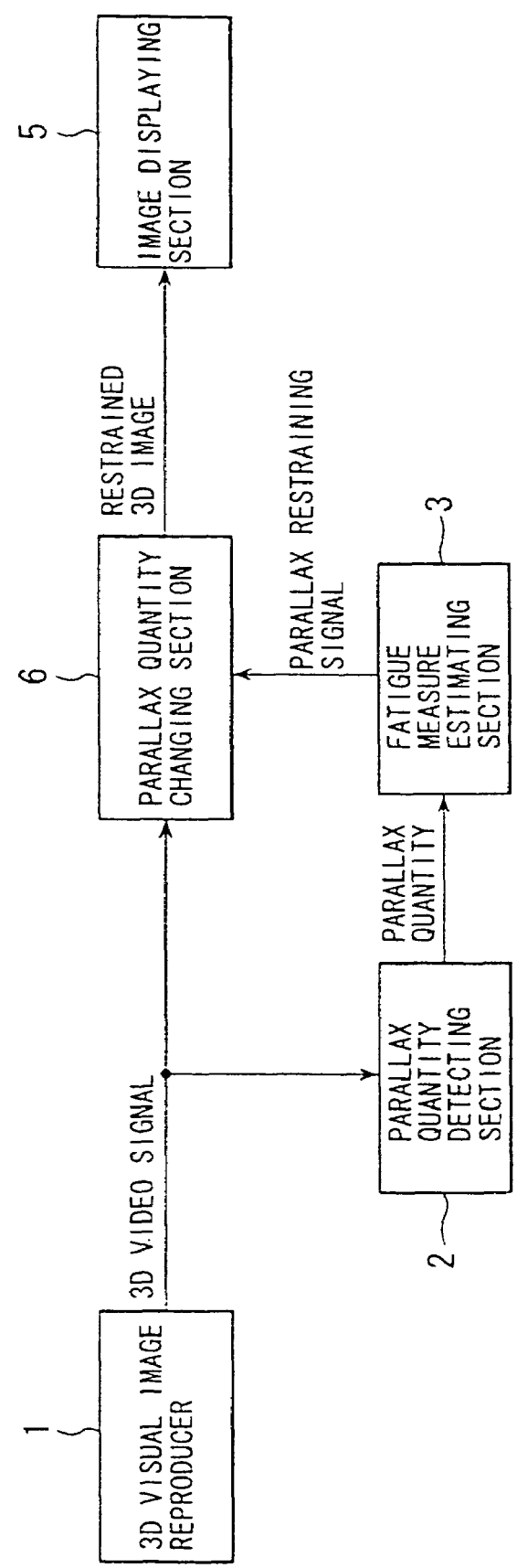
FIG. 6 is a block diagram showing a second embodiment of the present invention.

A second embodiment will now be described. FIG. 6 is a block diagram showing the second embodiment, where like components as in the first embodiment shown in FIG. 1 are denoted by like numerals. In this embodiment, a parallax quantity changing section 6 is provided instead of the 3D/2D image switching section 4 in the first embodiment. It is constructed such that a restrained stereoscopic video signal is provided with changing the parallax quantity (three-dimensionality) in stereoscopic video signal to a restrained parallax quantity, i.e., a target parallax quantity (restrained three-dimensionality) at which for example fatigue is not caused even after an uninterrupted observation, based on an output signal (parallax restraining signal) from a first comparison section, of the fatigue measure estimating section 3 of the same construction as that in the first embodiment shown in FIG. 5, where a value of function f(p) corresponding to parallax is compared with the allowable convergence limit value "a" and based on an output signal (parallax restraining signal) from a second comparison section where the accumulated calculation value of function f(p) corresponding to parallax is compared with the allowable accumulated convergence limit value "b". This target parallax quantity corresponds to the value at which accumulated fatigue due to an uninterrupted observation is allowable, i.e., an allowable accumulated fatigue value.

Figure 7A:
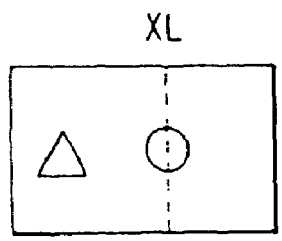
FIGS. 7A, 7B, 7C, 7D illustrate an example of restraining the degree of three-dimensionality in a stereoscopic image.
Figure 7B:
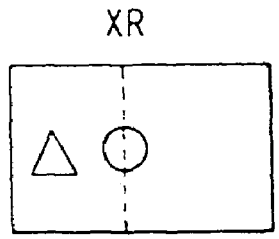
Figure 7C:
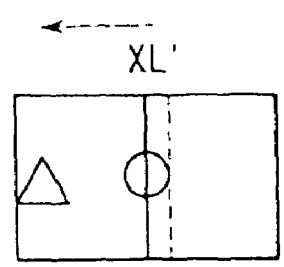
Figure 7D:
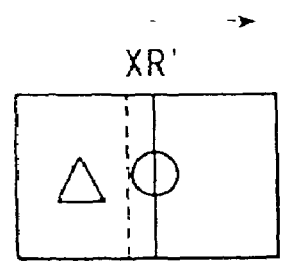

A description will now be given by way of FIGS. 7A to 7D with respect to an example of conversion into a stereoscopic video signal at a restrained parallax quantity. FIGS. 7A and 7B represent the left-eye image and right-eye image that are based on a stereoscopic video signal from the three-dimensional image reproducer. In order to restrain the parallax quantity (XL–XR) of these images, the left-eye image shown in FIG. 7A as a whole is shifted toward the left and the right-eye image shown in FIG. 7B as a whole is shifted toward the right so as to change them as shown in FIGS. 7C and 7D. This shifting amount is the parallax restraining quantity. As a result of this operation, the parallax quantity (XL'–XR') becomes smaller so that a stereoscopic image is obtained as of the parallax quantity (three-dimensionality) at which fatigue is not caused even after an uninterrupted observation.

Figure 8A:
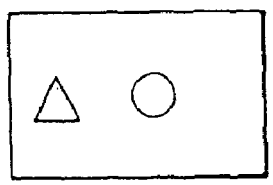
FIGS. 8A, 8B, 8C illustrate another example of restraining the degree of three-dimensionality in a stereoscopic image.
Figure 8B:
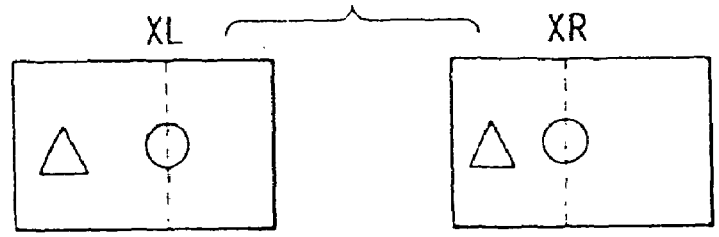
Figure 8C:
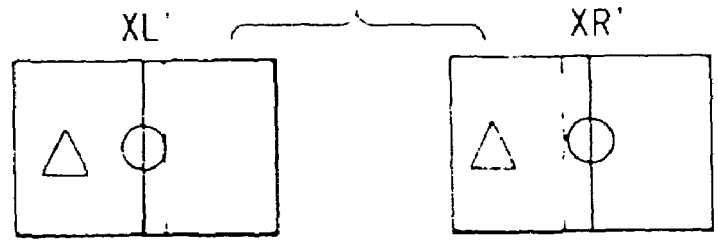

In the above embodiment, shifting of the left and right images toward different directions from each other is shown as the technique for restraining parallax quantity. Other techniques for restraining the degree of three-dimensionality include a technique in which a compression of depth is effected. Particularly, in the technique for transforming a two-dimensional image into a three-dimensional image as disclosed in Japanese patent application laid-open No.9-116928 which has previously been shown as a prior-art example, a relative depth of the object is inferred for example from the contrast in image and a three-dimensional visual image is generated by imparting a distortion to the image correspondingly to such depth. When an inference is made by applying this technique as that a sphere is located in front of a triangular body in the two-dimensional image as shown in FIG. 8A, a stereoscopic image is generated by imparting a distortion [corresponding to parallax (XL–XR)] so that the position of the sphere is different between the left-eye image and the right-eye image as shown in FIG. 8B. If the degree of three-dimensionality is to be restrained in such case, a visual image is generated as shown in FIG. 8C in which the amount of distortion of the sphere is restrained. It is thereby possible to obtain a stereoscopic image of which the degree of three-dimensionality is restrained by compressing the depth thereof. The amount of distortion [parallax quantity (XL'–XR')] at this time is desirably a distortion amount within ±0.5 diopter (D) of visual range (accommodation) as also can be seen from the diagram of correspondence in FIG. 3.

A third embodiment of will now be described. In the technique for transforming a two-dimensional visual image into a three-dimensional visual image as disclosed in Japanese Patent Publication No.2594235 which has previously shown as a prior-art example, a three-dimensional image is generated by setting a parallax quantity (delay amount) according to the extent of motion in the two-dimensional image. The third embodiment is adapted to form a 2D/3D image switching signal at a fatigue measure estimating section on the basis of the parallax quantity set in such technique.

Figure 9:
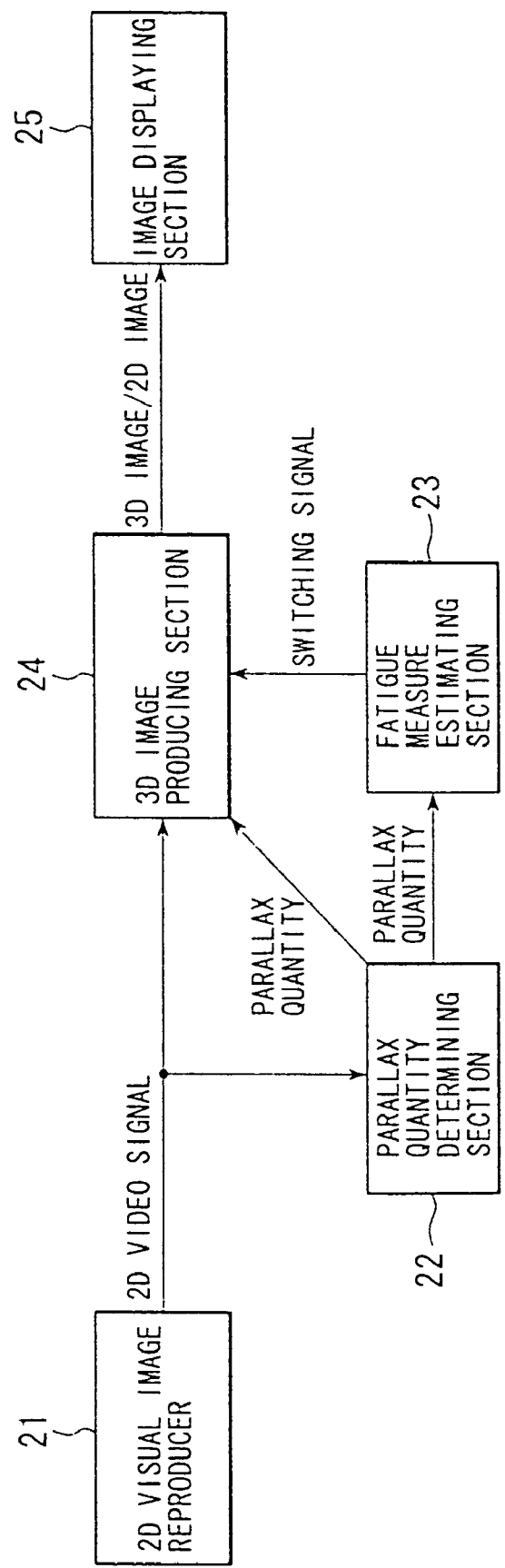
FIG. 9 is a block diagram showing a third embodiment of the present invention.

FIG. 9 is a block diagram showing the third embodiment, including: 21, a two-dimensional image reproducer; 22, a parallax quantity determining section for determining the parallax quantity based on the extent of motion in the two-dimensional video signal from the two-dimensional image reproducer 21; and 23, a fatigue measure estimating section of the same construction as the fatigue measure estimating section in the first and second embodiments shown in FIGS. 1 and 6, receiving a parallax quantity from the parallax quantity determining section 22 and transmitting a 2D/3D image switching signal. What is denoted by numeral 24 is a three-dimensional image generating section for receiving the parallax quantity set at the parallax quantity determining section 22 and transforming a two-dimensional image into a three-dimensional image, and 25 is a visual image display section for displaying a three-dimensional image from the three-dimensional image generating section 24 or a two-dimensional image.

Figure 10A:
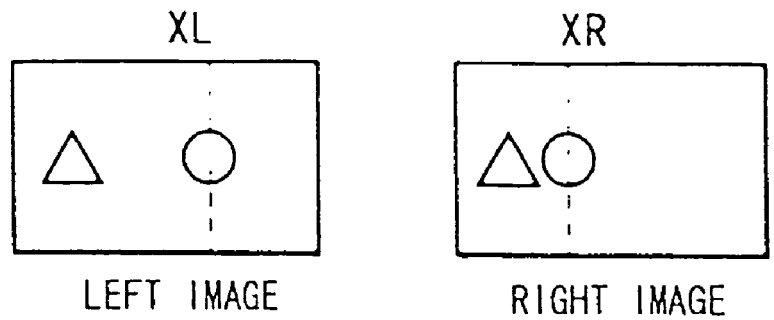
FIGS. 10A, 10B, 10C, 10D show the manner of continuously varying parallax quantity in a stereoscopic image.
Figure 10B:
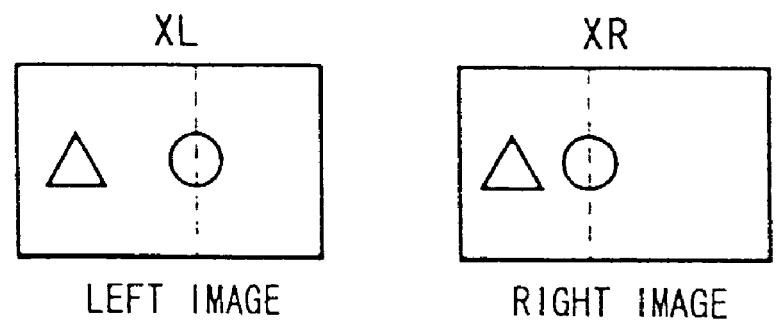
Figure 10C:
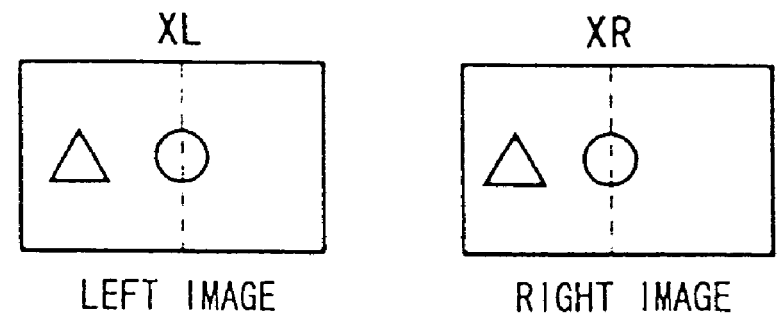
Figure 10D:
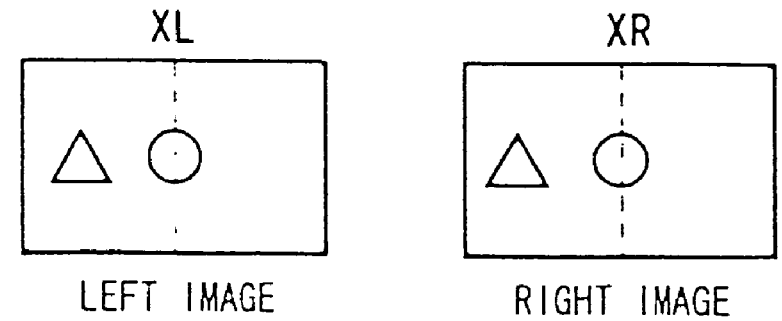

In the first and third embodiments shown in FIGS. 1 and 9, switching from a three-dimensional image to a two-dimensional image is made instantly with an interruption by a switching signal from the fatigue measure estimating section. If a three-dimensional image is thus switched in an instant to a two-dimensional image, however, a fusion image cannot be formed due to the large temporal change in parallax. A modification of the embodiments shown in FIGS. 1 and 9 is thus described below by way of FIGS. 10A to 10D, where the system is switched to a two-dimensional image while smoothly changing the degree of three-dimensionality, i.e., the parallax quantity is continuously changed. In this modification, the parallax (XL–XR) between the three-dimensional left and right images as shown in FIG. 10A is gradually reduced to those shown in FIGS. 10B and 10C. A two-dimensional image is formed at the end by achieving XL=XR as shown in FIG. 10D. Switching of 3D/2D visual images is thereby possible without causing discomfort.

Figure 11:
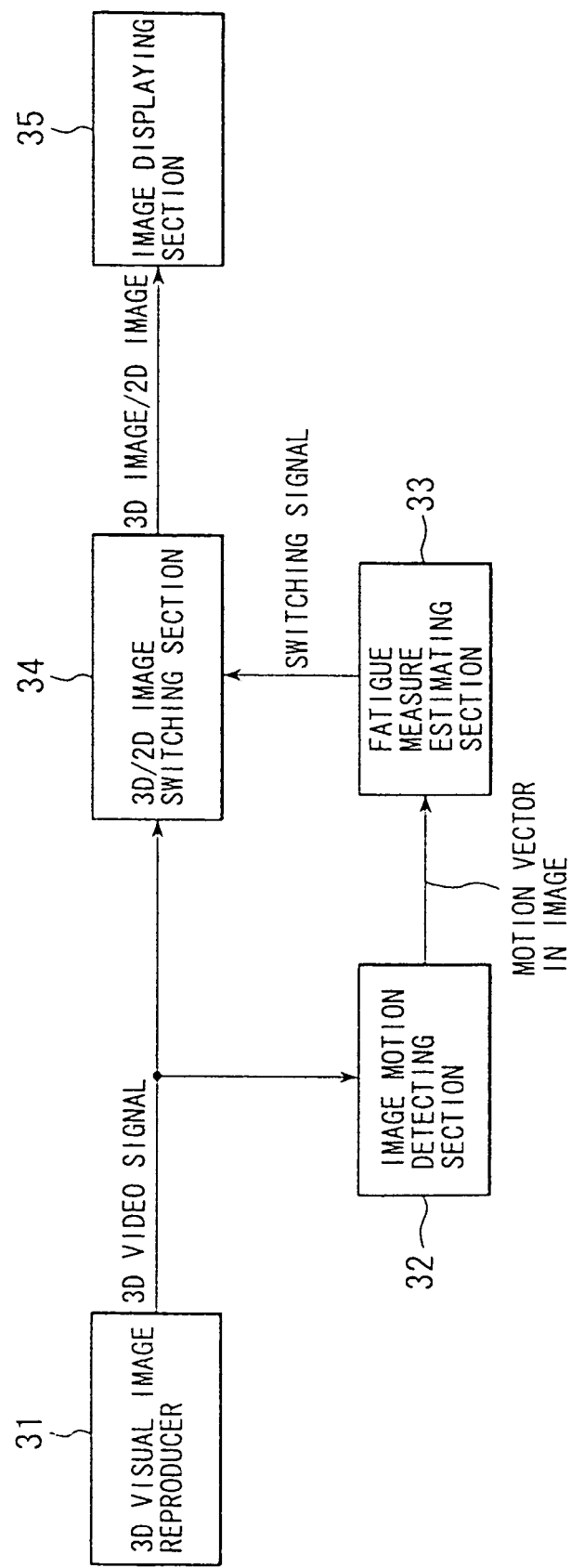
FIG. 11 is a block diagram showing a fourth embodiment of the present invention.

A fourth embodiment will now be described. In this embodiment, instead of parallax quantity in a three-dimensional image, motion vectors in the image are detected and the three-dimensional image is switched to a two-dimensional image on the basis of such motion vectors. It is generally said that a visual image involving a vigorous motion produces a greater influence on the observer. The present embodiment is made to eliminate an occurrence of such phenomenon. FIG. 11 is a block diagram showing the fourth embodiment, including: 31, a three-dimensional image reproducer; 32, an image motion detecting section for detecting motion vectors in a three-dimensional video signal outputted from the three-dimensional image reproducer 31; 33, a fatigue measure estimating section for estimating the degree of fatigue based on the motion vectors detected at the image motion detecting section 32; 34, a 3D/2D image switching section for providing an output by switching between three-dimensional video signal and two-dimensional video signal according to a switching signal which is provided on the basis of an estimation of fatigue measure; and 35, a visual image display section for displaying a three-dimensional image or a two-dimensional image provided from the image switching section 34.

Figure 12A:
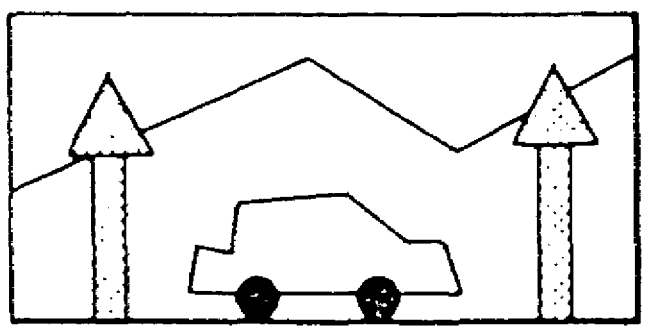
FIGS. 12A, 12B, 12C illustrate an example of detecting motion vectors in visual image.
Figure 12B:
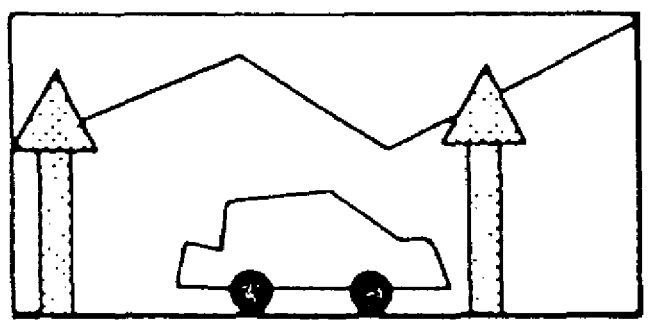
Figure 12C:
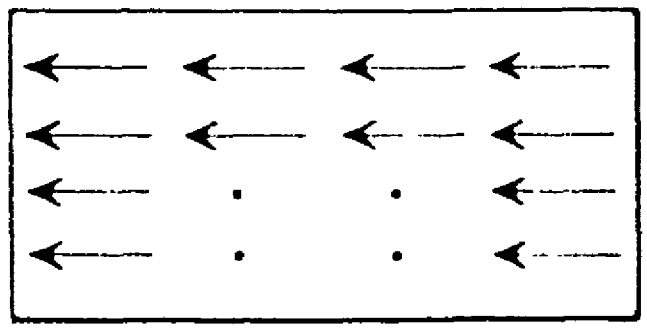

An example of detection of motion vector at the image motion detecting section 32 will now be described by way of FIGS. 12A to 12C. In this example of detection, the background is being moved to the left as shown in FIGS. 12A and 12B. Accordingly, motion vectors as shown in FIG. 12C are detected and, for example, an average of these values is inputted to the fatigue measure estimating section 33.

Figure 13:
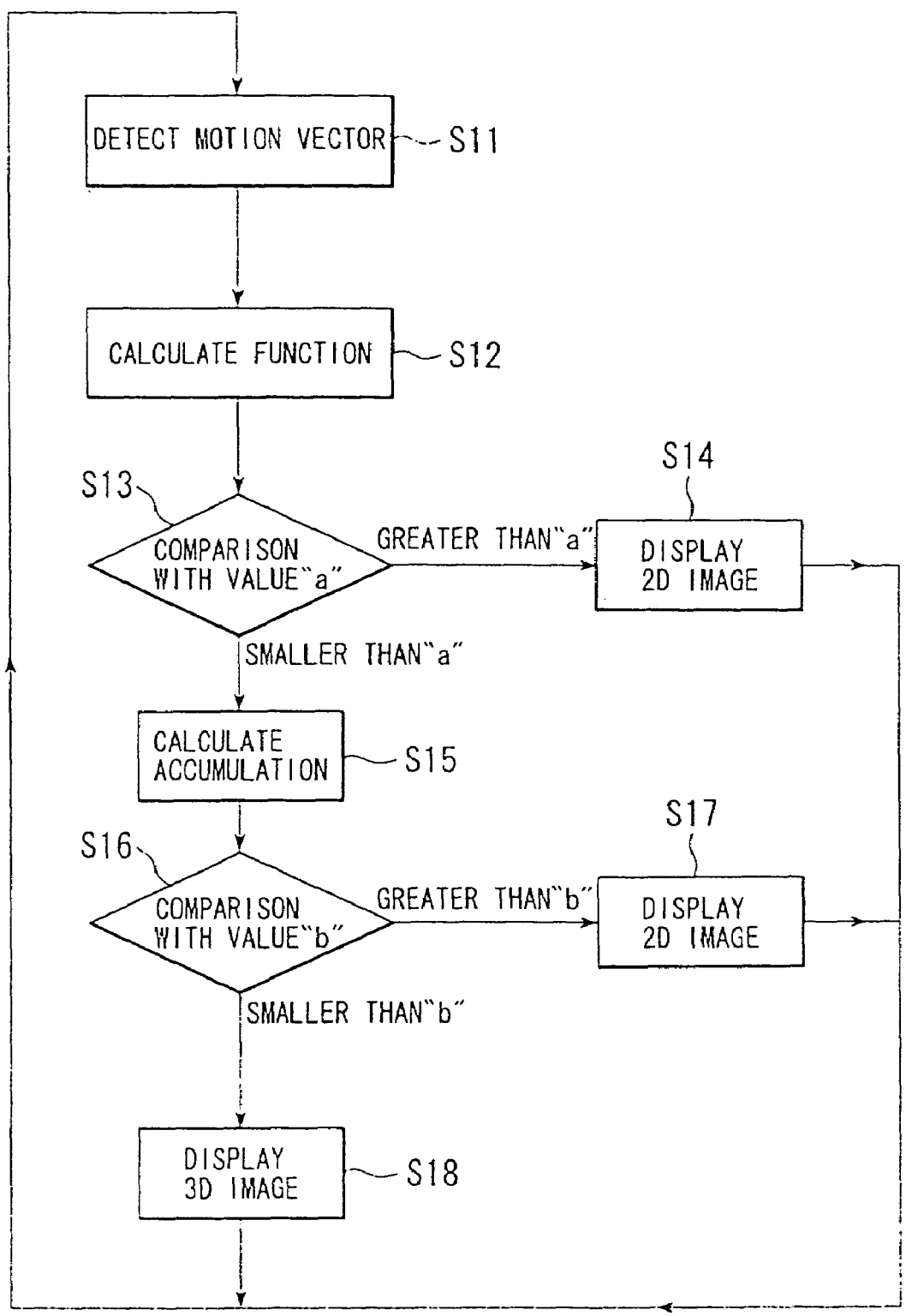
FIG. 13 is a flowchart for explaining an algorithm to be followed at the fatigue estimating section in the fourth embodiment shown in FIG. 11.

A description will now be given by way of the flowchart in FIG. 13 with respect to an algorithm to be executed at the fatigue measure estimating section 33 in this embodiment. First, a motion vector "m" is detected from a stereoscopic video signal (step S11). A function calculation for estimating the degree of fatigue is then performed on the basis of the detected motion vector "m" (step S12). This function calculation is performed by considering the influence (fatigue) produced on the eye of the observer by the image motion in the stereoscopic image. For example, a value of function f(m) is obtained on the basis of the extent and movement of the motion vector, the function being defined as that non-linearly increasing in relation to the motion vector "m" such as in $f(m)=\alpha \cdot m^2 + \beta \cdot m + \gamma$. The value f(m) obtained by the above described function calculation is then compared with an allowable limit value "a" (step S13). If the value f(m) obtained by the function calculation based on the motion vectors is greater than the allowable limit value "a", the system is switched to display a two-dimensional image (step S14). If the value of function f(m) is smaller than the allowable limit value "a", a time accumulation is calculated of the function value f(m) (step S15). The calculated value of accumulation of value f(m) obtained by the function calculation based on the motion vectors is then compared with an allowable accumulation limit value "b" (step S16). If the calculated value of accumulation of the function calculation value f(m) has exceeded the allowable accumulation limit value "b", the system is switched to display a two-dimensional image (step S17). If it is smaller than the allowable accumulation limit value "b", the three-dimensional (stereoscopic) image is displayed as it is (step S18) and the above operation is executed in repetition.

Figure 14:
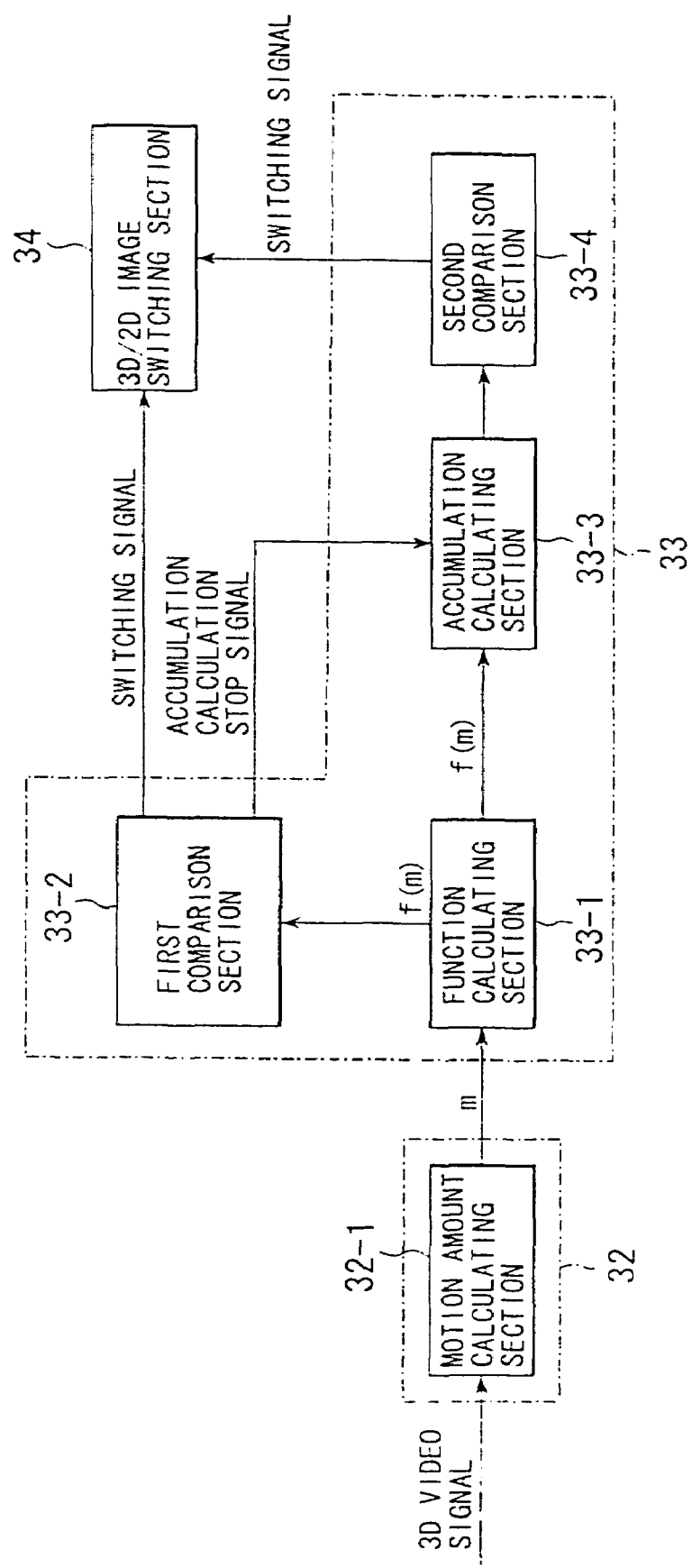
FIG. 14 is a block diagram showing a construction of the fatigue estimating section in the fourth embodiment shown in FIG. 11.

A description will now be given by way of the block diagram of FIG. 14 with respect to the construction of the image motion detecting section and the fatigue measure estimating section for executing the algorithm shown in FIG. 13. The image motion detecting section 32 is constituted by a motion amount calculating section 32-1 for computing the motion vector "m" from a stereoscopic video signal. The fatigue measure estimating section 33 includes a function calculating section 33-1 for receiving motion vector "m" provided from the image motion detecting section 32 and outputting a corresponding function value f(m). Similarly to the first embodiment, an actual function calculation is not performed at the function calculating section 33-1, but it includes a table within a ROM so that, when a value of motion vector "m" has been inputted, a function value f(m) matching the corresponding influence measure (fatigue measure) is read out.

The fatigue measure estimating section 33 further includes: a first comparison section 33-2 for receiving the value of function f(m) outputted from the function calculating section 33-1 and comparing it with the above described allowable limit value "a"; and an accumulation calculating section 33-3 for also receiving the value of function f(m) outputted from the function calculating section 33-1 and calculating the time accumulation of such value f(m). If the value f(m) from the function calculating section 33-1 is greater than the allowable limit value "a" at the above described first comparison section 33-2, a signal for temporarily switching the stereoscopic image to a two-dimensional image is provided to the stereoscopic/2D image switching section 34 and at the same time a stop signal for temporarily stopping the accumulation calculation is transmitted to the above described accumulation calculating section 33-3. The fatigue measure estimating section 33 furthermore includes a second comparison section 33-4 for comparing the accumulated value outputted from the accumulation calculating section 33-3 with the above described allowable accumulated convergence limit value "b". A signal for continuously switching the stereoscopic image to a two-dimensional image is transmitted when the accumulated value from the accumulation calculating section 33-3 has exceeded the allowable accumulated convergence limit value "b".

A fifth embodiment will now be described. In this embodiment, a parallax quantity (delay amount) is set in accordance with an extent of motion in a two-dimensional image in a similar manner as the third embodiment, and a 3D/2D image switching signal is formed at the fatigue measure estimating section by using the extent of motion in the two-dimensional image detected in generating a three-dimensional image.

Figure 15:
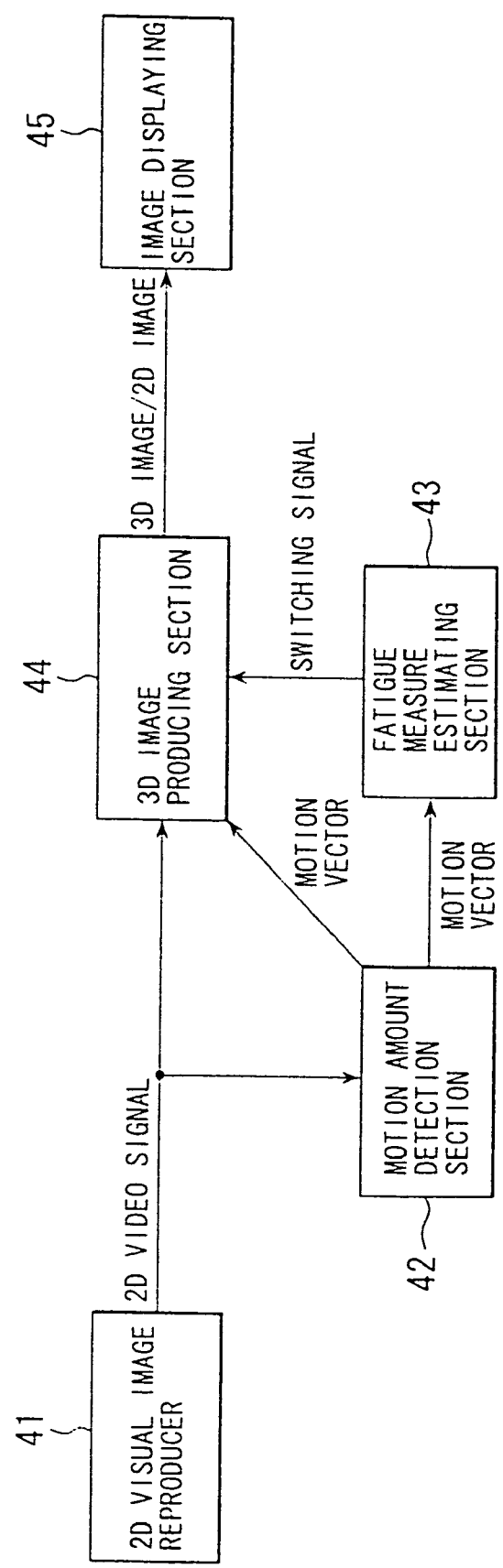
FIG. 15 is a block diagram showing a fifth embodiment of the present invention.

FIG. 15 is a block diagram showing the fifth embodiment, including: 41, a two-dimensional image reproducer; 42, a motion amount detecting section for detecting motion vectors based on a two-dimensional video signal from the two-dimensional image reproducer 41; 43, a fatigue measure estimating section of the same construction as the fatigue measure estimating section 33 in the fourth embodiment shown in FIG. 11 for receiving motion vectors from the motion amount detecting section 42 and transmitting a 3D/2D image switching signal. What is denoted by numeral 44 is a three-dimensional image generating section for receiving the motion vectors detected at the motion amount detecting section 42 and transforming a two-dimensional image into a three-dimensional image, and 45 is a visual image display section for displaying the three-dimensional image from the three-dimensional image generating section 44 or a two-dimensional image.

In the above described fourth and fifth embodiments, too, it is furthermore possible to restrain the three-dimensionality of three-dimensional image by an output signal from the fatigue measure estimating section instead of the switching from three-dimensional image to two-dimensional image. Furthermore, it is also possible to cause a smooth change in parallax quantity as shown in FIGS. 7, 8 and 10.

As has been described by way of the above embodiments, since, in accordance with the invention, the degree of influence produced on the observer is estimated from inputted video signal and the three-dimensionality of stereoscopic image is restrained or a stereoscopic image is switched to a two-dimensional image on the basis of such influence measure estimating quantity, it is possible to achieve a visual image system in which a stereoscopic image can be suitably controlled so as not to produce such effects as fatigue on the observer without any biological measurement on the observer. Further, since, in accordance with the invention, the degree of influence produced on the observer is estimated from inputted video signal and display method of image is controlled on the basis of such influence measure estimating quantity, it is possible to achieve a visual image system in which the display method of image such as switching of stereoscopic image to two-dimensional image or restraining of parallax quantity can be suitable controlled so as not to produce such effects as fatigue on the observer without any biological measurement on the observer.

What is claimed:

1. A visual image system to present a stereoscopic image to an observer; the system comprising:
   an influence amount estimator, calculating from an inputted video signal an estimate of a degree of influence produced on the observer;
   a three-dimensionality controller restraining a degree of three-dimensionality of the stereoscopic image to be presented to the observer based on an influence measure estimated quantity obtained from the influence amount estimator; and
   a parallax-quantity detector detecting a parallax quantity in images from the inputted video signal,
   wherein said influence amount estimator calculates the estimate of the degree of influence based on the parallax quantity detected by said parallax-quantity detector.

2. A visual image system to present a stereoscopic image to an observer; the system comprising:
   an influence amount estimator, calculating from an inputted video signal an estimate of a degree of influence produced on the observer;
   a three-dimensionality controller restraining a degree of three-dimensionality of the stereoscopic image to be presented to the observer based on an influence measure estimated quantity obtained from the influence amount estimator; and
   a shift amount detector detecting a temporal shift amount in images from the inputted video signal,
   wherein said influence amount estimator calculates the estimate of the degree of influence based on the temporal shift amount in images detected by said shift amount detector.

3. The visual image system according of any of claims 1 and 2, wherein said three-dimensionality controller restrains the degree of three-dimensionality of stereoscopic image to a value equal to or smaller than an allowable limit value of accumulated influence produced on the observer.

4. The visual image system according to claim 3, wherein restraint of three-dimensionality by said three-dimensionality controller is effected in such a manner as to change the degree of three-dimensionality smoothly without an interruption.

5. The visual image system according to claim 4, wherein said influence amount estimator calculates the estimate of the degree of influence produced on the observer by a time integral thereof.

6. The visual image system according to claim 3, wherein said influence amount estimator calculates the estimate of the degree of influence produced on the observer by a time integral thereof.

7. The visual image system according to any of claims 1 and 2, wherein restraint of three-dimensionality by said three-dimensionality controller is effected in such a manner as to change the degree of three-dimensionality smoothly without an interruption.

8. The visual image system according to claim 7, wherein said influence amount estimator calculates the estimate of the degree of influence produced on the observer by a time integral thereof.

9. A visual image system to present a stereoscopic image to an observer; the system comprising:
   an influence amount estimator, calculating from an inputted video signal an estimate of a degree of influence produced on the observer;
   a regulator, regulating switching of the stereoscopic image to a two-dimensional image based on an influence measure estimated quantity obtained from the influence amount estimator; and
   a parallax-quantity detector detecting a parallax quantity in images from the inputted video signal,
   wherein said influence amount estimator calculates the estimate of the degree of influence based on the parallax quantity detected by said parallax-quantity detector.

10. A visual image system to present a stereoscopic image to an observer; the system comprising:
    an influence amount estimator, calculating from an inputted video signal an estimate of a degree of influence produced on the observer;
    a regulator, regulating switching of the stereoscopic image to a two-dimensional image based on an influence measure estimated quantity obtained from the influence amount estimator; and
    a shift amount detector detecting a temporal shift amount in images from the inputted video signal,
    wherein said influence amount estimator calculates the estimate of the degree of influence based on the temporal shift amount in images detected by said shift amount detector.

11. The visual image system according to any of claims 9 and 10, wherein said regulator, while regulating switching from a stereoscopic image to a two-dimensional image, changes a degree of three-dimensionality of the stereoscopic image smoothly without an interruption.

12. The visual image system according to claim 11, wherein said influence amount estimator calculates the estimate of the degree of influence produced on the observer by a time integral thereof.

13. A visual image system to present a stereoscopic image to an observer; the system comprising:
    an influence amount estimator, calculating from an inputted video signal an estimate of a degree of influence produced on the observer;
    a display controller, controlling a display of a visual image to be presented to the observer based on an influence measure estimated quantity obtained from the influence amount estimator; and
    a parallax-quantity detector detecting a parallax quantity in images from the inputted video signal,
    wherein said influence amount estimator calculates the estimate of the degree of influence based on the parallax quantity detected by said parallax-quantity detector.

14. A visual image system to present a stereoscopic image to an observer; the system comprising:
    an influence amount estimator, calculating from an inputted video signal an estimate of a degree of influence produced on the observer;
    a display controller, controlling a display of a visual image to be presented to the observer based on an influence measure estimated quantity obtained from the influence amount estimator; and
    a shift amount detector detecting a temporal shift amount in images from the inputted video signal,
    wherein said influence amount estimator calculates the estimate of the degree of influence based on the temporal shift amount in images detected by said shift amount detector.

15. The visual image system according to any one of claims 1, 2, 9, 10, 13 and 14, wherein said influence amount estimator calculates the estimate of the degree of influence produced on the observer by a time integral thereof.

* * * * *